Nov. 27, 1951 L. T. WRIGHT 2,576,381
COTTON STRIPPER

Filed Nov. 30, 1945 2 SHEETS—SHEET 1

LEMUEL T WRIGHT
INVENTOR.

BY Lester B. Clark
Ray L. Smith
ATTORNEYS

Nov. 27, 1951 L. T. WRIGHT 2,576,381
COTTON STRIPPER
Filed Nov. 30, 1945 2 SHEETS—SHEET 2

LEMUEL T. WRIGHT
INVENTOR.
BY Lester B. Clark
Ray L. Smith
ATTORNEYS

Patented Nov. 27, 1951

2,576,381

UNITED STATES PATENT OFFICE 2,576,381

COTTON STRIPPER

Lemuel T. Wright, Brownfield, Tex.

Application November 30, 1945, Serial No. 631,814

1 Claim. (Cl. 56—30)

This invention relates to new and useful improvements in harvesters, and more particularly to cotton harvesters.

It is the primary object of the invention to provide a harvester of the class described which is simple and inexpensive to construct, maintain and operate, one which is in fact a one-man harvester.

Another object is to provide a harvester in which the cotton bolls are subjected to resilient stripping action to remove the cotton therefrom.

The invention also comprehends the use of pneumatic force which serves the dual function of supplementing the mechanical stripping action, and thereafter conducts the cotton from the picking head to a suitable receiver.

Still another object is to provide a cotton picker which includes a vehicle for receiving the picked cotton, such vehicle including a baffle toward which the cotton carrying stream of air is directed so that the cotton leaves the high velocity portion of the air stream and drops by gravity into a mass in the vehicle.

Another object is to provide a retainer screen above the baffle to remove residual cotton from the air moving from within the receiver.

A still further object is to provide a picker head of particular construction for effectively removing the cotton from the bolls and hence providing picked cotton with a minimum of foreign material such as portions of the cotton plant itself, and/or weeds that have grown among the cotton plants.

The foregoing objects together with other objects and features of the invention will be more fully understood from the following detailed description of an embodiment of the invention as shown in the accompanying drawings in which.

Figure 3:
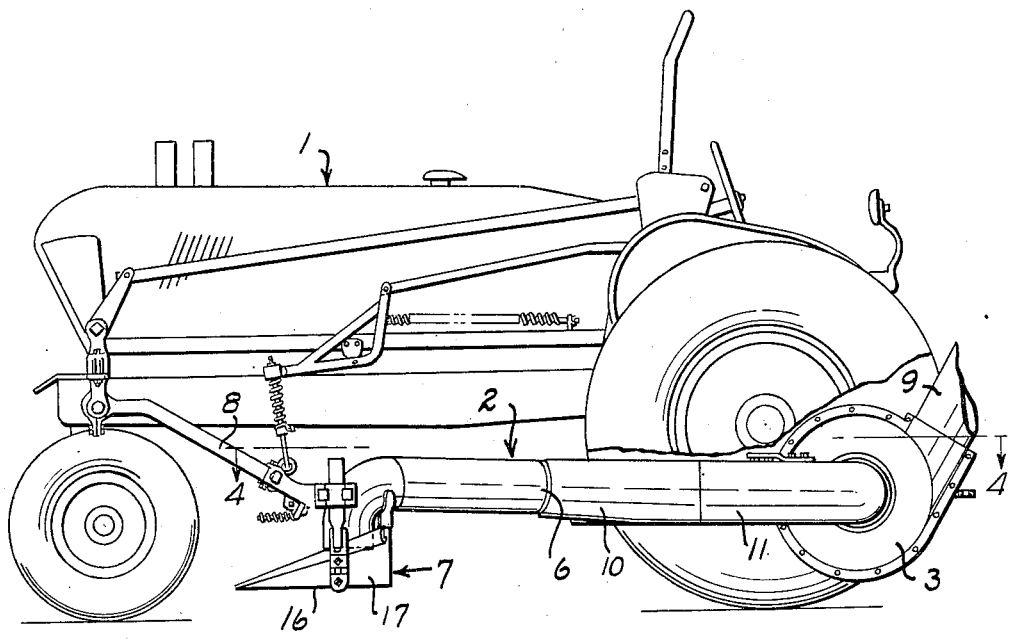
Fig. 3 is a side elevational view of a device embodying the invention and includes a power vehicle for motive and other operational power for the device.
Figure 4:
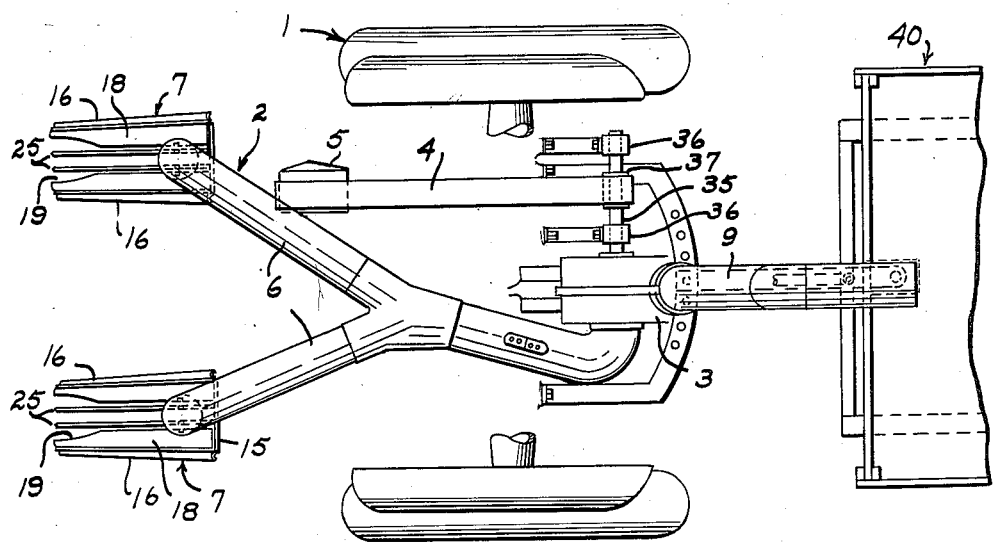
Fig. 4 is a plan view taken on the line 4—4 of Fig. 3 showing the rear portion of the power vehicle and the picker mechanism in combination therewith, this view also showing the forward portion of the trailer type of receiver of the invention.
Figure 5:
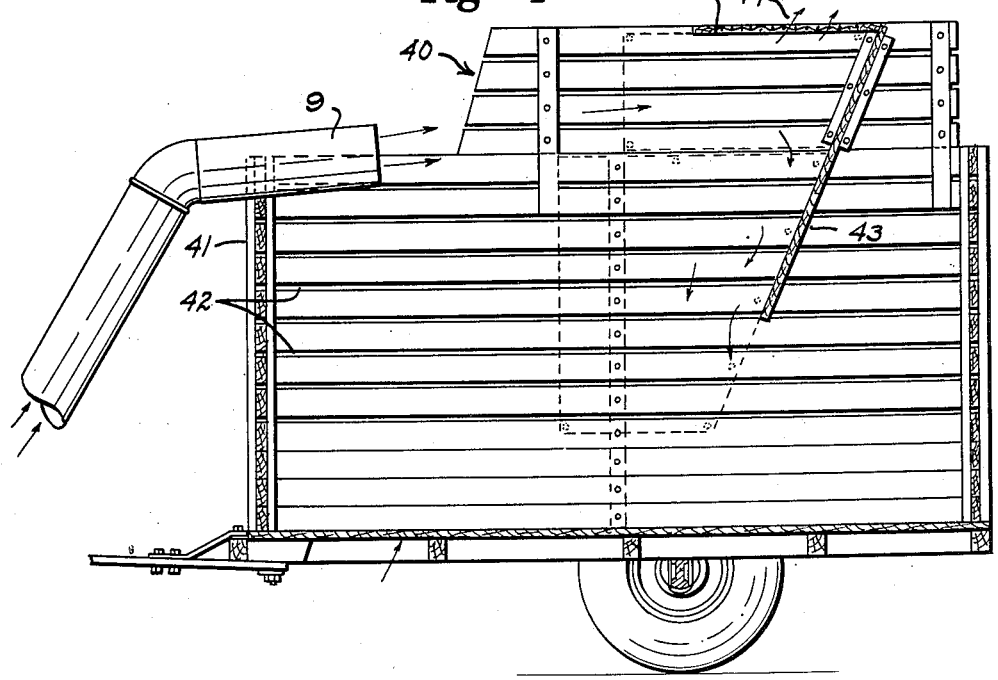
Fig. 5 is a vertical sectional view through the receiver showing the novel cooperating features thereof whereby there is a minimum of loss in the cotton conducted by way of an air stream from the picker head.

As best seen in Figs. 3 and 4 the picker vehicle is shown as a tractor 1 having picker mechanism 2 mounted thereon such mechanism including the blower 3 driven by the belt 4 upon the power take-off pulley 5 of the tractor. The in-put or suction side of the blower 3 includes the pipes 6 which lead to the picker heads 7 supported on arms 8 so that the heads can be maintained at a desired elevation as justified by the height of the cotton stalks from which cotton is being picked. The pipes 6 converge and enter the Y-shaped tubular fitting 10 whence the single pipe 11 communicates with the input of the blower 3. It is to be understood that, as will more fully appear, pneumatic suctional force within the pipes 6 and cooperates with the heads 7 in removing the cotton from the bolls and in conducting the cotton to the blower 3 and thence through the exhaust pipe 9 to all of which further attention will be directed.

Preferably two picker heads 7 are provided as shown, and are so spaced as to effect the picking of the cotton on two adjacent rows. It is to be understood, however, that the invention is not confined to the use of any particular number of heads inasmuch as this feature is a matter of choice. The construction of the individual picker heads, and the cooperation therewith of the forward ends of the pipes 6 to effect desired picking action, is of importance and further attention will be specifically directed to details of the preferred embodiment.

Figure 1:
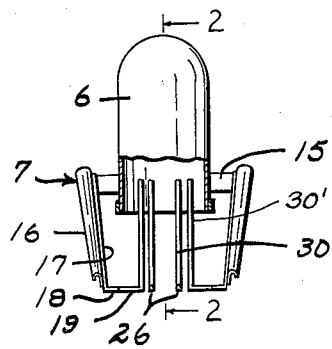
Fig. 1 is a front elevational view partly in section of the one or more picker heads comprising an element of the invention.
Figure 2:
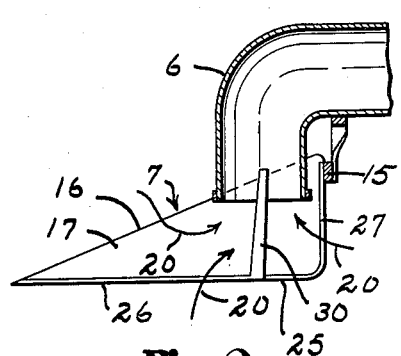
Fig. 2 is a side elevational view in section through the picker head and is taken on line 2—2 in Fig. 1.

Each of the picker heads 7 includes a transverse strength or support member or beam 15 at its rearward end. Secured to this member and extending downwardly and forwardly thereof are guides 16 having vertical side portions 17 and inwardly flanged bottoms 18 which are tapered at 19 at their forward ends to provide a V-shaped entrance to the picker head 7. The flange 18 extends rearwardly and thence upwardly to the member 15 whereby there is formed an enclosure of such construction that air entering the suction pipe 6 must move thereto in the directions generally indicated by the arrows 20 (Fig. 2).

Intermediate the side assemblies 16 just described are L-shaped teeth or prongs 25 having forward horizontal portions 26 and rearward vertical portions 27. These teeth are supported at their rear and upper end to the member 15 so that their lower or horizontal portions 26 lie in the same plane as their flanges 18 of the side assembly 16. The teeth 25 are of sufficiently heavy material to withstand the stresses to which they are subjected from normal use but are, because of their configuration, sufficiently flexible both transversely and vertically that they will move enough to permit cotton plants to pass therebetween, or between either of such prongs and the flange 18 adjacent thereto. This feature of construction and mode of operation avoids the uprooting of the plants and clogging of the head. It also minimizes the amount of extraneous material that will be stripped from the plants and released within the head for removal therefrom through the pipe 6.

Spaced forwardly of the vertical portions 27 of the teeth 25 are strippers 30 which comprise upwardly extending bars secured to the teeth; the adjacent flanges 18 are provided with strippers 30' whereby the strippers 30 and 30' are in side by side relation. The forward face of each of these bars 30 and 30', or the entire bar, is inclined rearwardly to induce rising of the cotton stripped from the stalks at this point in the picker head 7. The forward end of the suction pipe 6 is in the form of an elbow and extends downwardly and about the upper ends of these bars. Dimensions of this structure are such that the pipe end is sufficiently close to the rear of the picker head that the movement of air as indicated by the arrows 20 supplements mechanical action produced by the bars 30 and the upwardly extending portions of the teeth 25 and the flanges 18. At the same time the material stripped from the stalks is picked up by the current of air to and through the pipe 6.

The blower 3 may be of any suitable construction and includes a shaft 35 mounted in journals 36 upon the tractor 1. The pulley 37 is mounted upon this shaft intermediate the bearings and the belt 4 passes over this pulley whereby necessary driving torque is imparted to the runner within the blower 3.

The outlet or exhaust pipe 9 from the blower 3 extends for a suitable distance to conduct the stripped cotton to the receptacle 40 which is preferably of the trailer type. Such receiver comprises a body 41 having slots 42 in the sides thereof to facilitate the exhaust of air from within the body. Mounted transversely of the body and of the air stream from the exhaust pipe 9 is a baffle 43 which extends from side to side of the body 41. This baffle together with the enlarging space into which the air stream exhausts causes a rapid retarding of the velocity of the air whereby separation of the cotton from the air takes place and the cotton moves downwardly within the body under the action of gravity. A small amount of the picked cotton may tend to move upwardly from the top of the body as indicated by the arrows 44. To avoid the loss of such cotton there is provided a screen 45 across the top of the body 41. Inasmuch as there are fluctuations in the air pressure exerted at various points within the body 41, any cotton which may have been retained by the screen 45 will periodically fall therefrom and become a part of the mass collected within the body.

The operation of the described embodiment of the invention is believed apparent from the foregoing description, but attention is further directed thereto by way of summary and supplement. It will be assumed that proper adjustment is had that the picker heads 7 are at a proper distance above the ground so that the bolls from which cotton is to be picked enter the head 7 as the tractor 1 advances along the rows of cotton. Power is imparted from the pulley 5 to the belt 4 and thence to the blower 3 which produces a suction within the pipe 6 and an adequate air exhaust through the pipe 9 to carry the picked cotton from the head to the receptacle 40.

As the tractor 1 advances, the cotton plants enter the respective picker heads 7 by way of the spaces between the teeth 25 and also between such teeth and the adjacent guiding surfaces of the flanges 18. As the plants move into engagement with the strippers 30, stripping action takes place thus effecting removal of the cotton from the bolls within the area where suction from the pipe 6 is strongest. The plants then move to and through the slots or spaces between the teeth 25 at the rearward ends thereof and between the respective teeth and the next adjacent flanges 18, below the beam 15.

The stripping action to which reference has just been made is supplemented by the lifting action produced by the inclination of the bars or strippers 30, and also by the suction produced within this area by the pipe 6 having its forward end proximate the upper ends of the bars 30 within the head. It is therefore emphasized that the combined action produced by passage of the stalks or plants between the strippers 30, modified by the sloping construction thereof, plus the upsurging air currents at the instant the boll is separated from the stalk makes further agitation unnecessary whereby complicated and moving parts with attendant difficulties are eliminated. It is also to be noted that no agitation of the cotton plants takes place until the plants come under the influence of the suction and for this reason loss from flying cotton is small.

It is intended that the invention shall not be confined to specific details of the embodiment disclosed and explained because the invention broadly comprehends a cotton harvester that is simple and inexpensive to construct, maintain and operate, and one which is adaptable for use by the individual farmer of small acreage as well as the producer from a large acreage.

What is claimed is:

In a cotton picker the improvement comprising a stripper head having a forward stripping portion and a rearward receiving portion, said head including a support member, guides attached to said member and extending forwardly therefrom in spaced relation, each of said guides having a sidewall and a lower inwardly flanged portion, the forward portion of said flanged portions providing forwardly diverging guide surfaces in the forward stripping portion so that cotton plants are guided centrally within the head as the head moves forwardly about the plants, L-shaped guide members secured to the support and extending in parallel spaced relation downwardly therefrom, the horizontal portion of said L-shaped guide members extending forwardly in spaced relation with and intermediate said flanged portions whereby the cotton plants are resiliently engaged and cotton bolls are stripped therefrom as the head moves over the cotton plants, upwardly extending stripper projections in side-by-side relation on said guides and L-shaped guide members intermediate the ends thereof to effect initial stripping action within the head, and a suction pipe extending into said head and proximate said stripper projections whereby supplemental stripping action is effected from air entering the pipe about the stripper projections.

LEMUEL T. WRIGHT.

REFERENCES CITED

The following references are of record in the file of this patent:

UNITED STATES PATENTS

| Number | Name | Date |
|---|---|---|
| 691,762 | Haertl | Jan. 28, 1902 |
| 1,036,357 | Skaer | Aug. 20, 1912 |
| 1,106,019 | Wilcoxson | Aug. 4, 1914 |
| 1,400,522 | Cannon | Dec. 20, 1921 |
| 1,722,747 | Hentz | July 30, 1929 |
| 2,076,598 | Rust et al. | Apr. 13, 1937 |